(12) United States Patent
Daffara et al.

(10) Patent No.: US 12,204,913 B2
(45) Date of Patent: Jan. 21, 2025

(54) SYSTEM AND METHOD FOR AUTOMATIC INSTALLATION AND CONFIGURATION OF COMPUTING RESOURCES

(71) Applicant: Nodeweaver Corporation, Weston, FL (US)

(72) Inventors: Carlo Daffara, Povoletto (IT); Lorenzo Faleschini, Belluno (IT)

(*) Notice: Subject to any disclaimer, the term of this patent is extended or adjusted under 35 U.S.C. 154(b) by 51 days.

(21) Appl. No.: 18/096,137

(22) Filed: Jan. 12, 2023

(65) Prior Publication Data

US 2023/0229452 A1 Jul. 20, 2023

Related U.S. Application Data

(60) Provisional application No. 63/361,777, filed on Jan. 19, 2022.

(51) Int. Cl.
*G06F 9/4401* (2018.01)

(52) U.S. Cl.
CPC .................. *G06F 9/4403* (2013.01)

(58) Field of Classification Search
CPC .................. G06F 9/4403; G06F 8/60
See application file for complete search history.

(56) References Cited

U.S. PATENT DOCUMENTS

| | | | | |
|---|---|---|---|---|
| 7,774,774 B1* | 8/2010 | Mulligan | ............ | G06F 9/44505 717/176 |
| 11,323,317 B1* | 5/2022 | Levin | ...................... | H04L 67/34 |
| 11,765,154 B2* | 9/2023 | Eichen | .................. | H04L 9/3263 713/168 |
| 2009/0232020 A1* | 9/2009 | Baalbergen | ......... | H04L 12/2809 370/254 |
| 2015/0341207 A1* | 11/2015 | Ma | .......................... | H04L 41/08 709/220 |
| 2017/0171206 A1* | 6/2017 | Joffe | ....................... | H04L 63/10 |
| 2019/0334765 A1* | 10/2019 | Jain | ........................... | G06F 8/71 |
| 2021/0135942 A1* | 5/2021 | Jefferies | ............. | H04L 61/3005 |

* cited by examiner

*Primary Examiner* — Faisal M Zaman
(74) *Attorney, Agent, or Firm* — Assouline & Berlowe; Peter A. Koziol, Esq.

(57) ABSTRACT

A system and method for installation and configuration of computing resources where a local attribute that uniquely identifies a deployed device is used with a query to a remote domain name server to receive one or more responses to the query, the responses from the domain name server providing the steps and operations to implement an expected local configuration which is then validated and implemented in each the deployed device.

11 Claims, 3 Drawing Sheets

| Record | Value |
| --- | --- |
| 4ae72b998aa70 | deployment1.domain0.nodeweaver.eu |
| a254026922d0 | deployment1.domain0.nodeweaver.eu |
| cf8920420461 | deployment2.domain0.nodeweaver.eu |
| c93460324582 | deployment2.domain0.nodeweaver.eu |
| deployment1.domain0 | IP='172.16.1.220';GO_PROXY='ON';LABEL='demo1.dev.nodeweaver.eu'; ALERT_EMAILS='test@nodeweaver.eu';GEO_POSITION='Europe';BOOTS TRAP='IyEvYmluL2Jhc2gKIyBib290c3RyYXAgYSBOb2RlV2VhdmVyIG1hcmtldHBsY WNlIGZyb20gYSBjbGVhbiBPcmFjbGUgTGludXggOCBpbWFnZQoKdmVyc2lvbj0iM TIuMC0yMTExMTcxNjI5IgoKCmlmIFsgLWYgLy5ib290c3RyYXBwZWQgXTsgdGhlb goKCSMgaWYgYWxyZWFkeSBzBzZWVkZWQgdGhlbiBleGl0IGltbWVkaWF0ZWx5IGFu ZCB0YWtlIG5vIGFjdGlvbgoJZXhpdCAwCgplbHNlCgogICAgICAgICMgc2V0IGhvc' |
| deployment2.domain0 | IP='172.16.2.220';GO_PROXY='ON';LABEL='demo2.dev.nodeweaver.eu'; ALERT_EMAILS='test@nodeweaver.eu';GEO_POSITION='Europe';BOOTS TRAP='IyEvYmluL2Jhc2gKIyBib290c3RyYXAgYSBOb2RlV2VhdmVyIG1hcmtldHBsY WNlIGZyb20gYSBjbGVhbiBPcmFjbGUgTGludXggOCBpbWFnZQoKdmVyc2lvbj0iM TIuMC0yMTExMTcxNjI5IgoKCmlmIFsgLWYgLy5ib290c3RyYXBwZWQgXTsgdGhlb goKCSMgaWYgYWxyZWFkeSBzBzZWVkZWQgdGhlbiBleGl0IGltbWVkaWF0ZWx5IGFu ZCB0YWtlIG5vIGFjdGlvbgoJZXhpdCAwCgplbHNlCgogICAgICAgICMgc2V0IGhvc' |

FIG. 2

SYSTEM AND METHOD FOR AUTOMATIC INSTALLATION AND CONFIGURATION OF COMPUTING RESOURCES

CROSS-REFERENCE TO RELATED APPLICATIONS

This patent application claims the benefit under 35 U.S.C. § 119(e) of U.S. Provisional Patent Application No. 63/361,777 filed on Jan. 19, 2022 and titled "Automatic Installation and Configuration of Computing Resources", which application is incorporated herein by reference.

BACKGROUND OF THE INVENTION

Field of the Invention

This invention relates generically to edge and fog computing, and to configuring a computing system and the relevant computing assets by determining its configuration and automatically implementing that configuration in a continuous way.

The amount of data generated by smart devices, sensors and other data sources has grown in an exponential way, with much of the data being discarded or left unprocessed because there is not enough bandwidth or an excessive latency to transport and process the data in a central location. Edge and Fog computing allow this processing to be performed locally, where the data is being generated and to also help in complying with local regulations or requirements for data processing (for example in the handling of health care data). This is being done through the installation and configuration of local edge computing devices, that are computational devices capable of performing local processing, data storage and autonomous operation. The devices themselves need to be delivered to the remote location, configured properly and managed—which is a complex feat in environments that may be remote, not permanently (or at all) connected to the internet, and may be deployed by inexperienced operators. The complexity of configuring these devices introduces a potential for human errors, resulting in the possibility of serious security issues. Thus, there is a need for the automated installation and configuration of these devices in a secure, efficient, effective, and universal manner.

SUMMARY OF THE INVENTION

It is the object of the present invention to provide a system and method for performing the automated installation and configuration of complex computing resources through a distributed and universally accessible set of configuration attributes, in which suitable computing equipment with local storage and networking capabilities is able to automatically retrieve the information that is needed to configure itself for the planned task and automate the set of operations necessary to complete the configuration of any local resource that is required for its operation. The same process can continuously monitor whether changes are required and implement them without user intervention. The invention can modify the physical properties of the underlying computing elements, through the change in how the storage devices are configured and data is written on them, and through the changes in how the network connectivity devices receive and send data to external network devices. Amongst other things, the invention improves the networked system, the devices, and methods in which local and deployed devices are configured.

BRIEF DESCRIPTION OF THE DRAWINGS

FIG. 2 is an example of a data table containing the edge deployment information according to one embodiment.

The figures depict various embodiments of the present invention for purposes of illustration only. One skilled in the art will readily recognize from the following discussion that alternative embodiments of the structures and methods illustrated herein may be employed without departing from the principles of the invention described herein.

DETAILED DESCRIPTION OF PREFERRED EMBODIMENT(S)

Figure 1:
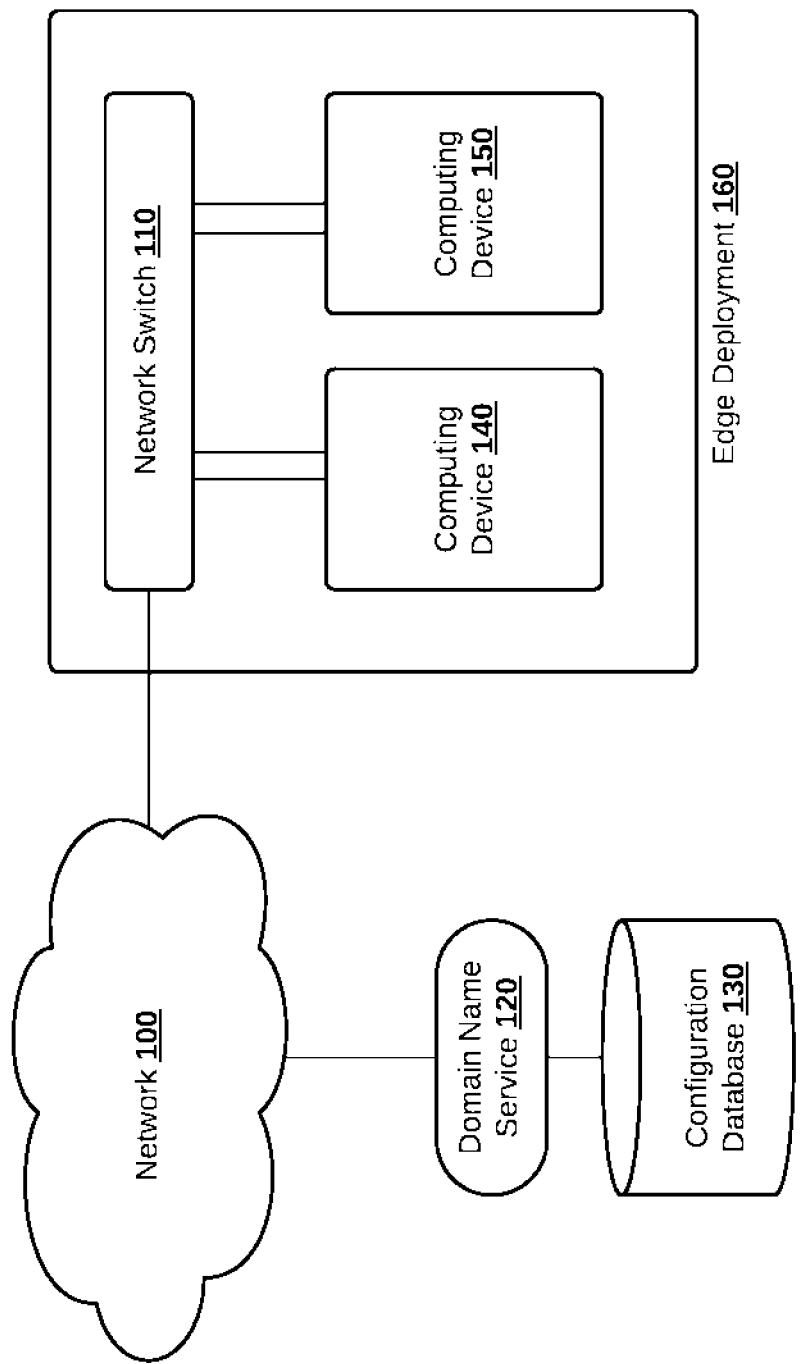
FIG. 1 is a high-level block diagram illustrating a remote edge deployment according to one embodiment

FIG. 1 is a high-level block diagram illustrating an edge deployment site according to one embodiment. FIG. 1 illustrates an edge deployment 160, composed by one or more computing devices 140 and 150 that needs to be configured for the user requirements to be satisfied. These computing devices are connected to a network switch 110, and through this network switch to either a private or public network 100 that does have the ability to reach through the IP protocol the Domain Name Service (DNS) 120, that uses a configuration database 130 to store and provide the requested information. Although only one network switch is shown, additional network switches may be connected to the computing devices for redundancy.

Figure 3:
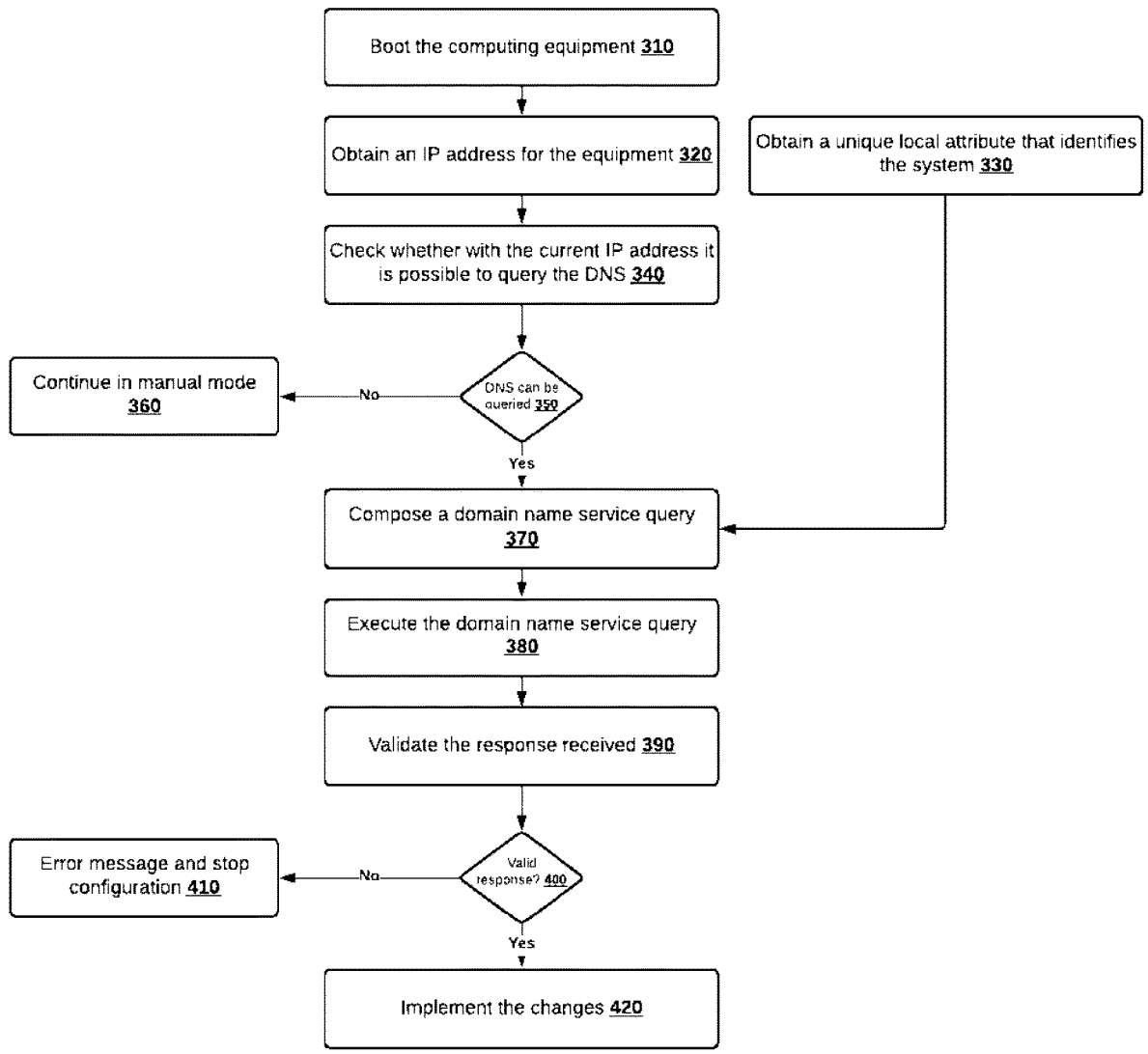
FIG. 3 is a flow chart illustrating a process for determining and implementing the process for the configuration of the edge devices according to one embodiment.

FIG. 2 is an example of a data table containing the edge deployment information, stored in the configuration database 130. The information is held in tuples composed of a record and a content, where Record is the value that needs to match in the DNS, and Value is the response that the DNS service will return. In this example, two edge deployments have been configured, called deployment1.domain0 and deployment2.domain0, with two computing devices configured for each deployment, respectively 4ae72b998aa70 and a254026922d0 for deployment1.domain0 and cf8920420461 and c93460324582 for deployment2.domain0. The records 4ae72b998aa70, a254026922d0, cf8920420461 and c93460324582 are the unique identifier values that the process 330 of FIG. 3 would generate for the hardware, and the responses ties those values to a specific deployment name, in this case deployment1.domain0 and deployment2.domain0. This allows for the system to know which deployment a specific hardware is tied to, and allows for the second query to be performed, obtaining for each deployment the actual configuration that needs to be applied, in this case the attributes IP='172.16.1.220';GO_PROXY='ON';
LABEL='demo1.dev.nodeweaver.eu';ALERT_EMA
ILS='test@nodeweaver.eu';GEO_POSITION='Europe';
BOOTSTRAP='IyEvYmluL2Jhc2gKJyBi
b290c3RyYXAgYSBOb2RIV2VhdmVyIG1hcmtldHBsY-
WNlIGZyb20gYSBjbGVhbiBPcmFjbGUgT
GludXggOCBpbWFnZQoKdmVyc2lvbj0iMTIuMCOyM-
TExMTcxNjI5IgoKCmlmIFsgLWYgLySib
290c3RyYXBwZWQgXTsgdGhlbgoKCSMgaWYgYWxy-
ZWFkeSBzZWVkZWQgdGhlbiBleGl0IGlt bWVkaWF0ZWx5IGFuZCBOYWtlIG5vIGFjdGlvbgoJZ-XhpdCAwCgplbHNlCgogICAgICAgICMg c2V0IGhvc'for deployment 1 and IP='172.16.2.220';GO_PROXY='ON';LABEL 'demo2.dev.nodeweaver.eu';ALERT_EMA ILS='test@nodeweaver.eu';GEO_POSITION='Europe'; BOOTSTRAP='IyEvYmluL2Jhc2gKJyBi b290c3RyYXAgYSBOb2RIV2VhdmVyIG1hcmtldHBsY-WNlIGZyb20gYSBjbGVhbiBPcmFjbGUgT GludXggOCBpbWFnZQoKdmVyc2lvbj0iMTIuMCOyM-TExMTcxNjI5IgoKCmlmIFsgLWYgLySib 290c3RyYXBwZWQgXTsgdGhlbgoKCSMgaWYgYWxy-ZWFkeSBzZWVkZWQgdGhlbiBleGl0IGlt bWVkaWF0ZWx5IGFuZCB0YWtlIG5vIGFjdGlvbgoJZ-XhpdCAwCgplbHNlCgogICAgICAgICMg c2V0IGhvc' for deployment 2. The text response for the DNS query contains the attributes that the internal agent uses to implement the configurations.

FIG. 3 is a flow chart illustrating a process for determining and implementing the process for the configuration of the edge devices. The process starts with the booting of the computing devices 310, after which the systems get through either the DHCP protocol, a link local allocation or other means a valid and routable IP address that is meant to be used to communicate with the DNS through the network of FIG. 1 100. The system also generates or extracts a unique identifier, which may be in any form, like a sequence of hexadecimal characters, a string or any combination of binary sequences. This unique identifier is obtained through either hardware properties of the physical system, or other means that allow to guarantee an extremely low or zero probability to be matched by any other physical system. Examples of this process may be the use of MAC addresses of one or more of the physical Ethernet devices if present, the serial number of the processor on the motherboard or of any other physical component of the computing device, or any combination or result of the process of an algorithm on the same values, that would still give a unique value for a specific physical computing device. The system then checks in step 340 whether the IP address provided in step 320 can be used to query the domain name service; if that is not possible, the process continues in manual mode by warning the user 360. If the DNS can be queried, the system composes the DNS query by using the unique local attribute in 370, executes in 380 the query, and validates the response received in 390. If the response returned is not valid, the system stops in 410 and returns an error message. On a valid response, in 420 the system implements the changes. This process is repeated periodically, to allow the system to change its configuration in response to changes to the configuration database 130.

The foregoing description of the embodiments of the invention has been presented for the purpose of illustration; it is not intended to be exhaustive or to limit the invention to the precise forms disclosed. Persons skilled in the relevant art can appreciate that many modifications and variations are possible considering the above disclosure.

The invention improves the system and deployed devices. Amongst the many other benefits described herein and those to be discovered, the invention enables fleet deployment and management and is field-deployable by unskilled personnel. The invention provides for fleet management. The invention is autonomously operating, self-healing and self-optimizing. The invention operates in air-gapped environments providing continuous operation even in locations with no or intermittent internet. The invention is lightweight computationally as it consumes several orders of magnitude less CPU and RAM than other methods of configuring devices which is critical in resource constrained deployments. The invention provides predicable performance for high priority workloads even under full system load. It has demonstrated use in varied of fields including PV&Wind Plant Management, AI driven weld inspection, smart video deployments and autonomous vehicles. Additionally, the invention minimizes the acquisition cost of hardware and software for each edge location, reduces the amount of time and effort to configure the edge locations and optimizes the cost and effort of the full management and maintenance life cycle.

Some portions of this description describe the embodiments of the invention in terms of algorithms and symbolic representations of operations on information. These algorithmic descriptions and representations are commonly used by those skilled in the data processing arts to convey the Substance of their work effectively to others skilled in the art.

These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof. Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all the steps, operations, or processes described. Embodiments of the invention may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments of the invention may also relate to a product that is produced by a computing process described herein. Such a product may comprise information resulting from a computing process, where the information is stored on a non-transitory, tangible computer readable storage medium, and may include any embodiment of a computer program product or other data combination described herein. Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based herein. Accordingly, the disclosure of the embodiments of the invention is intended to be illustrative, but not limiting, of the scope of the invention, which is set forth in the following claims.

While particular elements, embodiments and applications of the present invention have been shown and described, it will be understood, that the invention is not limited thereto since modifications can be made by those skilled in the art without departing from the scope of the present disclosure, particularly in light of the foregoing teachings.

Furthermore, particular elements of the present invention as described in the embodiments above can be incorporated into the System and Method for Automatic Installation and Configuration of Computing Resources in other suitable combinations or arrangements, for example, to suit particular applications.

The examples used herein are only some embodiments of the invention. Thus, it is seen that the objects of the present invention are efficiently obtained, although modifications and changes to the invention should be readily apparent to those having ordinary skill in the art, which modifications are intended to be within the spirit and scope of the invention as claimed. It is also understood that the foregoing description is illustrative of the present invention and should not be considered as limiting. Therefore, other embodiments of the present invention are possible without departing from the spirit and scope of the present invention.

What is claimed is:

1. A method comprising:
    booting computing equipment for a deployed system;
    obtaining a local IP address through DHCP or link local protocol;
    obtaining a local attribute that uniquely identifies the deployed system;
    sending a domain name service message to a remote system that uses the local attribute and a deployment domain;
    receiving a set of responses to the domain name service message, each response indicative of an expected local configuration;
    validating the local configuration; and,
    performing operations to implement the expected local configuration in the deployed system.

2. The method of claim 1, wherein the local attribute involves an extraction of a physically unique identifier, the physically unique identifier including at least one or more from the following: a hardware identifier; and, a physical property.

3. The method of claim 1, wherein the local attribute is used to request through a Domain Name System the expected local configuration.

4. The method of claim 1, wherein the expected local configuration is stored locally in the computing equipment for the deployed system.

5. The method of claim 2, wherein the hardware identifier is an ethernet MAC address, processor serial number, or motherboard serial number.

6. The method of claim 2, wherein the physical property is: geographical information; positional information; or, any computational attribute obtained from such information.

7. The method of claim 4, where the configuration is validated as compatible with one or more physical properties of the deployed system.

8. The method of claim 4, where the expected local configuration is transformed in a sequence of individual configuration actions, to be executed by a local software agent.

9. The method of claim 8, where the local software agent executes one or more planned actions, and provides feedback information of any error in the execution.

10. The method of claim 8, where the local software agent is periodically executed while the deployed system is powered on.

11. The method of claim 8, where the local software agent identifies any change in a remote configuration obtained through a Domain Name System and implements any change by re-executing the sequence of individual configuration actions.

* * * * *